United States Patent
Petrus et al.

(10) Patent No.: US 7,519,011 B2
(45) Date of Patent: Apr. 14, 2009

(54) FRAME STRUCTURE FOR RADIO COMMUNICATIONS SYSTEM

(75) Inventors: Paul Petrus, Santa Clara, CA (US); Christopher R. Uhlik, Danville, CA (US); Mitchell D. Trott, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 1105 days.

(21) Appl. No.: 10/262,104

(22) Filed: Sep. 30, 2002

(65) Prior Publication Data

US 2003/0169722 A1 Sep. 11, 2003

Related U.S. Application Data

(63) Continuation-in-part of application No. 09/841,456, filed on Apr. 24, 2001, now Pat. No. 6,650,714, and a continuation-in-part of application No. 09/813,194, filed on Mar. 20, 2001, now Pat. No. 6,996,060, and a continuation-in-part of application No. 09/675,274, filed on Sep. 29, 2000.

(51) Int. Cl.
 *H04J 3/00* (2006.01)
(52) U.S. Cl. ........................ 370/280; 370/294; 370/337; 370/347; 370/442
(58) Field of Classification Search ........................ None
See application file for complete search history.

(56) References Cited

U.S. PATENT DOCUMENTS

| | | | | |
|---|---|---|---|---|
| 5,602,836 A | * | 2/1997 | Papadopoulos et al. | 370/280 |
| 5,603,079 A | * | 2/1997 | Olds et al. | 455/13.1 |
| 5,754,536 A | * | 5/1998 | Schmidt | 370/330 |
| 5,905,719 A | * | 5/1999 | Arnold et al. | 370/330 |
| 6,097,707 A | * | 8/2000 | Hodzic et al. | 370/321 |
| 6,353,598 B1 | * | 3/2002 | Baden et al. | 370/280 |
| 6,980,527 B1 | * | 12/2005 | Liu et al. | 370/280 |
| 7,027,424 B1 | * | 4/2006 | Horvat et al. | 370/337 |
| 2002/0071415 A1 | * | 6/2002 | Soulabail et al. | 370/337 |
| 2002/0098821 A1 | * | 7/2002 | Struhsaker | 455/305 |
| 2002/0105935 A1 | * | 8/2002 | Miya | 370/342 |
| 2002/0196766 A1 | * | 12/2002 | Hwang et al. | 370/342 |
| 2003/0045307 A1 | * | 3/2003 | Arviv et al. | 455/464 |

FOREIGN PATENT DOCUMENTS

| | | |
|---|---|---|
| GB | 2367217 A | 3/2002 |
| WO | WO 02/11317 A1 | 2/2002 |

* cited by examiner

*Primary Examiner*—Wing F Chan
*Assistant Examiner*—Anthony Sol
(74) *Attorney, Agent, or Firm*—Blakely, Sokoloff, Taylor & Zafman LLP

(57) ABSTRACT

In one embodiment, the present invention includes a repeating frame for a time division radio communications system with a sequence of uplink slots each having a predetermined duration, a sequence of downlink slots, each having a predetermined duration that is greater than the duration of the uplink slots, an interburst guard time between each uplink slot, an interburst guard time between each downlink slot, and an interframe guard time after the sequence of downlink slots.

72 Claims, 5 Drawing Sheets

FRAME STRUCTURE FOR RADIO COMMUNICATIONS SYSTEM

CROSS-REFERENCE TO RELATED APPLICATIONS

The present application is a continuation-in-part of prior commonly-owned applications, Radio Communications System With a Shared Broadcast Channel, U.S. Ser. No. 09/675,274, filed Sep. 29, 2000; Closing a Communications Stream Between Terminals of a Communications System, U.S. Ser. No. 09/813,194, filed Mar. 20, 2001 now U.S. Pat. No. 6,996,060; Spatial Processing and Timing Estimation Using a Training Sequence in a Radio Communications System, U.S. Ser. No. 09/841,456, filed Apr. 24, 2001 now U.S. Pat. No. 6,650,714 the priorities of which are hereby claimed.

BACKGROUND OF THE INVENTION

1. Field of the Invention

The present invention applies to a structure for a frame used in communications between base stations and user terminals and, in particular, to a frame structure that includes uplink and downlink slots in a time division format.

2. Description of the Prior Art

Time division mobile radio communications systems such as cellular data and voice radio systems typically use a repeating frame that includes slots allocated for specific purposes. In a frequency division TDD (Time Division Multiple Access) system, the repeating frame may include a set of downlink slots. The uplink slots are in a different frame on a different frequency. Broadcast, random access and control channel messages may each be assigned to specific frequencies that use a different frame structure. Each frame type can be optimized for the type of messages that it carries enhancing efficiency. In a TDD (Time Division Duplex) system, uplink and downlink slots are in the same frame. In some instances, specific slots within the frame may carry some control messages. However, the control and access channels are normally in separate frames.

Separate broadcast, control, and access channels allow great flexibility in designing a wireless radio network of base stations and remote user terminals. However, each channel that is set aside for broadcast, control, or access purposes cannot be used for traffic. When the number of channels is limited in comparison to the demand for traffic, it is preferred to maximize the traffic usage of all of the system's radio capacity. Combining different functions into a single frame, on the other hand, makes interference between neighboring slots likely. It also can restrict variations in the comparative data rate between uplink and downlink.

BRIEF SUMMARY OF THE INVENTION

In one embodiment, the present invention includes a repeating frame for a time division radio communications system with a sequence of uplink slots each having a predetermined duration, a sequence of downlink slots, each having a predetermined duration that is greater than the duration of the uplink slots, an interburst guard time between each uplink slot, an interburst guard time between each downlink slot, and an interframe guard time after the sequence of downlink slots.

In another embodiment, the repeating frame has a sequence of uplink slots each having a predetermined duration, the uplink slots supporting a plurality of transmission modes, a sequence of downlink slots, each having a predetermined duration that is greater than the duration of the uplink slots, the downlink slots supporting a plurality of transmission modes, the downlink slot transmission modes having a higher data rate than the uplink slot transmission modes, so that the downlink data rate is greater than the uplink data rate by more than the difference in duration between the downlink slots and the uplink slots.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Overview

Figure 1:
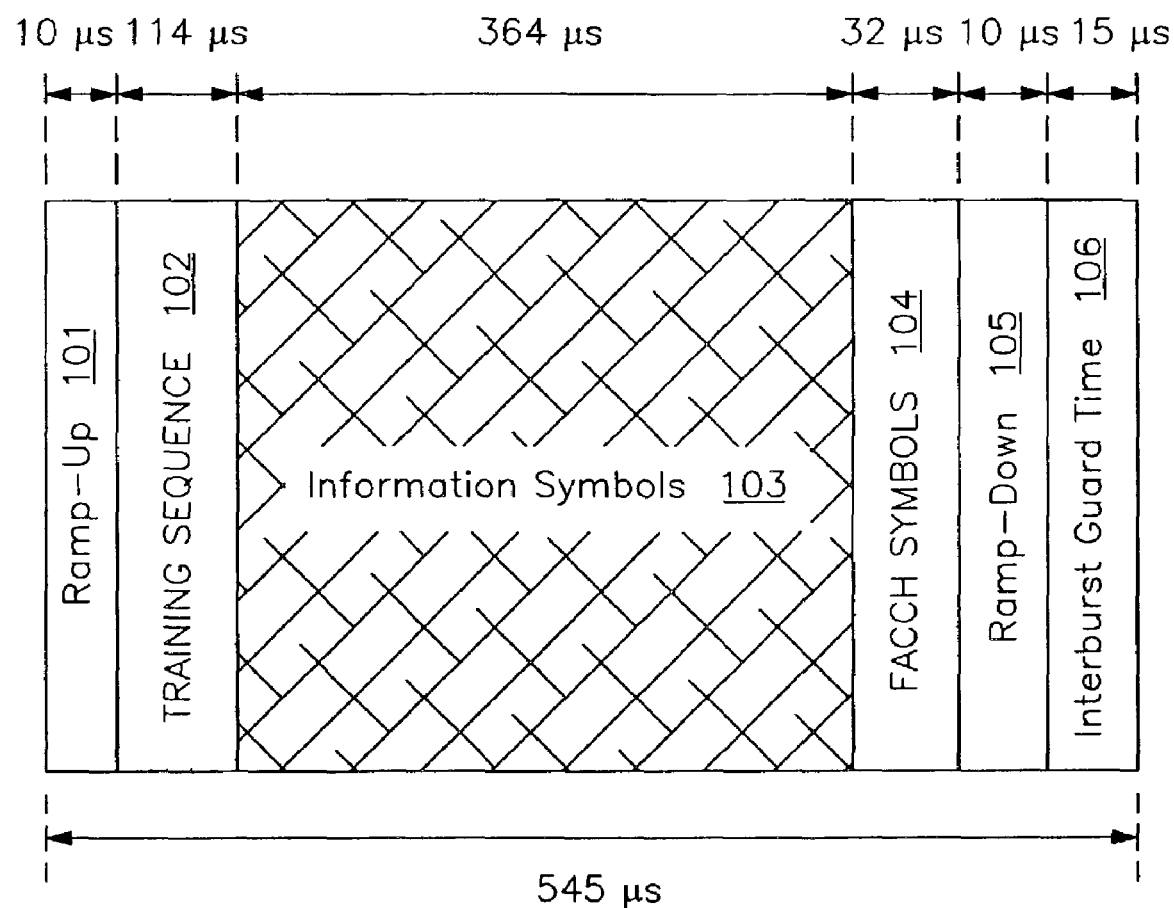
FIG. 1 is a diagram illustrating an example of a standard uplink slot structure according to one embodiment of the present invention.

In one embodiment of the invention, a unique frame structure for TDD (Time Division Duplex) communications allows uplink and downlink slots to share a single frame without interference. Appropriate guard times are positioned and sized between slots in order to eliminate interference between user terminals at different ranges and between downlink and uplink. The uplink and downlink slots can both be used for a variety of different types of messages including BCH, RACH, PCH, CCH and TCH. The ratio of uplink to downlink capacity is also selected to optimize the usefulness of the network's bandwidth allocations. Using a variety of different modulation classes in both the uplink and the downlink, the specific difference between uplink data rate and downlink data rate can be adjusted to accord with user demands.

In one embodiment, it is contemplated the invention is implemented in a TDD high bandwidth wireless data and voice system, such as ArrayComm's i-BURST™ system. However, it should be appreciated the invention is not limited to the i-BURST system or any other particular air interface, and in fact, it should become apparent from the description herein that the invention may find use with a variety of air interface protocols and communications systems.

Broadcast Channel (BCH)

The system of the present invention is initiated for each user terminal or remote terminal from the broadcast channel BCH which is transmitted as a burst from the base station to all potential user terminals. The BCH burst, unlike the traffic channel bursts, is transmitted in all directions where user terminals may be, typically omnidirectionally but the specific beam pattern will depend on the network. Accordingly, the BCH burst will create more interference on the system than spatially directed or lower power traffic channels TCH. For this reason, the data and modulation properties of the BCH channel are selected to minimize interference.

An example of a broadcast burst structure is shown in Table 1. Some of the important BCH burst properties are as follows. The BCH is computationally easy to find by scanning in real time having no knowledge of time-slot boundaries. It communicates enough basic information to enable a subsequent exchange of configuration request CR and configuration message CM between the base station and the user terminal. The BCH also provides good frequency offset and timing update information to all user terminals, even when the BCH is not specifically directed toward any one user terminal in particular.

Table 1 summarizes the content of an example of a BCH burst.

TABLE 1

| Duration | Contents |
|---|---|
| 10 μsec | ramp-up |
| 272 μsec | frequency correction training symbols $f_1, f_2, \ldots, f_{136}$ |
| 256 μsec | timing correction training symbols $t_1, t_2, \ldots t_{128}$ |
| 16 μsec | broadcast preamble $r_1, r_2, \ldots r_8$ |
| 512 μsec | information symbols $h'_1, h'_2, \ldots h'_{256}$ |
| 10 μsec | ramp-down |
| 14 μsec | inter-burst guard time |

The frequency and timing correction training symbols can be set according to any one of many approaches well-known in the art. They can also be combined, exchanged with a synchronization sequence or eliminated.

The broadcast information symbols are constructed from a 15-bit broadcast message which is modulated and coded into a 256 bit sequence. The number of symbols as well as the structure and sequence of transmitted bits can be varied to suit a wide variety of applications. The presently described embodiment has been selected in order to minimize the amount of information transmitted in the BCH as well as to minimize the bit rate. The broadcast channel information symbols provide the information needed for a user terminal to request a configuration message from the base station. They also provide information to guide user terminal handover decisions.

Each broadcast message is mapped into a broadcast burst with the information shown in Table 2.

TABLE 2

| Broadcast Message | |
|---|---|
| Field | # of Bits |
| BStxPwr | 5 |
| BSCC | 7 |
| BSload | 3 |
| Total | 15 |

BStxPwr is the effective isotropic radiated power of the broadcast message. This number indicates the power transmitted by the base station taking into account the number of amplifiers and diversity antennas available at the base station. For a 10 antenna broadcast channel, base station power= (2·BStxPwr+10) dBm.

BSCC is the base station color code, used by the user terminal to select training data for uplink bursts and to distinguish broadcasts of different base stations. In one embodiment, there are up to 128 different possible color codes. The color codes can be used to indicate a base station in a different location or a different modulator/demodulator set in the same location.

BSload is the load on the base station, used by the user terminal to determine how frequently to send random access messages. BSload is an indication of the amount of unused capacity the base station has. It can be different from the number of active registered subscribers because subscribers can require different amounts of traffic capacity. BSload represents the transmit and receive bit rates of each modem of the base station over a period of a few minutes measured against maximum possible loading.

In one embodiment, the BCH channel is shared by all base stations in the wireless communication system. Using the 7 bit BSCC, up to 128 base stations can be accommodated. The BCH is a time division duplex channel with a repeating frame. The channel is a single RF carrier frequency used for uplink and downlink. For high noise environments or for increased robustness, the BCH can hop frequencies according to a predetermined scheme or be repeated on several different frequencies. The repeating frame includes the downlink BCH for each base station, labeled BS1 etc. as shown in Table 3. The next frame includes the uplink Configuration Request CR, labeled CR1 etc. and downlink Configuration Message CM, labeled CM1 etc.

Each frame also includes a number of reserved slots, shown as empty boxes below. These slots can be used for data traffic, if the broadcast channel is also used for traffic, for other control messages or reserved to reduce interference on other channels in the network. The frames are repeated for each respective base station 1 to 128 to build a superframe as discussed in more detail below. After the last CM, CM128, the superframe repeats and begins again with the next superframe and the BCH for base station 1.

TABLE 3

|  |  | Uplink | Downlink |
|---|---|---|---|
| Superframe 1 | Frame 1 |  | BS1 |
|  | Frame 2 | CR1 | CM1 |
|  | Frame 3 |  | BS2 |
|  | Frame 4 | CR2 | CM2 |
|  | ... | ... | ... |
|  | Frame 255 |  | BS128 |
|  | Frame 256 | CR128 | CM128 |
| Superframe 2 | Frame 1 |  | BS1 |
|  | Frame 2 | CR1 | CM1 |
|  | ... | ... | ... |

A base station can be considered a collection of base station modems serving a group of contiguous RF carriers. Alternatively, a base station can be an installation with a set of modems at a single site. For other system configurations each modem modulator/demodulator set 52, 62 can be considered a base station. Each base station is assigned a unique 32-bit base station identifier, BSID. The BSID is used to derive a base station color code as follows: BSCC=BSID mod 128. As a function of the BSCC, a base station frequency hops, broadcasts BCH, listens for uplink CR, and sends downlink CM. Within a geographical region where radio transmissions overlap, the BSID should be assigned so that the BSCC is uniquely assigned. No base station should be able to routinely see user terminals that are communicating with a base station of the same color code. Likewise, no user terminal should be able to see two base stations that are assigned the same BSCC. The total number of base stations as well as the number of frames in a superframe, the number of slots in a frame and the particular slots used for transmitting BCH bursts, CRs and CMs can be modified to suit particular applications.

To minimize, the data rate of BCH bursts still further, the BSCC and BSload can be removed from the BCH burst. The BCH burst then contains only training or synchronization and BStxPwr, the only information directly related to handover decisions. The user terminal can still distinguish and compare different base stations for selection and handover decisions based on timing of the received BCH bursts. The user terminal can also direct its CR message to a specific base station as shown in Table 3 based on timing. For a single base station system, the BStxPwr bits can also be deleted. If there is only one base station, it is not necessary to evaluate path loss but only whether the signal can be received. The rest of the network information can be learned upon registration, described below. Alternatively, since the BCH includes the BSCC, the user terminal can be programmed to read the BSCC and assume that BCH bursts with a common BSCC are from the same base station. In this way, the user terminal can learn a shortened frame repetition interval, and reduce the time needed to register with the system.

Registration

A user terminal forms a relationship with a base station called a registration. This registration begins by listening to the broadcast channel and ends with a handover, timeout, or disconnection. The first step of registration is accomplished by a remote by sending the Configuration Request burst CR and receiving a Configuration Message burst CM. The CM contains basic configuration parameters such as hopping sequence calculation parameters. Using the information from the CM, the user terminal then opens an unauthenticated stream using a random access registration request RA-rreq. This unauthenticated stream carries only in-band signaling data used to complete registration and assignment of a registration identifier RID and paging identifier PID. Using the RID assigned at the end of the registration stream, the user terminal can open subsequent streams and it can end registrations. The user terminal can also open subsequent streams in which it can send packets which are used to perform "network login" to an Internet Service Provider (ISP).

During the registration stream, identities and capabilities are exchanged, operating parameters are set, and a RID and PID are assigned. Later, a new network session may be created and attached to this RID, or an existing session may be handed over. This handover may be from another base station, another base station modem on the same base station (load shifting), or even from a hibernating session on the same base station modem. The specific details of registration are provided here as examples only. Many other registration scenarios are also possible within the scope of the present invention.

The frame timing is established by the base stations that are in the area and transmitting on a pre-programmed RF carrier. The carrier may be a frequency hopping or spread spectrum carrier. However, it is preferred that the carrier be easy to find and be pre-programmed into the user terminals. The base stations, or base station if there is only one, employ GPS or some other precise common timing reference to establish the frame timing. GPS timing offers the advantage that it is accurately synchronized and inexpensively available to all base stations. This allows the BCH to be shared by all the base stations with only a minimal guard time in the BCH between base stations.

The base stations then build the BCH frame described above and broadcast in their respective assigned slots. When a user terminal turns on, it scans this well-known, optionally pre-programmed, RF carrier to find basic frame timing and synchronization. The user terminal scans this carrier for BCH bursts, building an RSSI (Received Signal Strength Indicator) map. From this BCH RSSI map and other factors, the user terminal selects the strongest or the best base station. It also uses the BCH to precisely adjust its oscillator frequency and adjust its frame timing reference. This is done using the synchronization and timing sequences in the BCH burst, described above. Then, using its user or remote terminal ID (UTID) it builds and sends a Configuration Request CR, timed relative to the BCH burst for that strongest or best base station. In one embodiment, the CR is scrambled using the BSCC that was received in the BCH from the selected base station.

If the intended base station successfully receives the CR and has available capacity, it unscrambles the CR, and determines the spatial signature of the user terminal. The user terminal receives a Configuration Message burst CM in reply. The CM, described in greater detail below, contains sufficient information for the user terminal to learn its distance and RF path-loss to the base station, correct its timing advance, adjust its power control, and learn the parameters of frequency hopping (e.g. frame numbering and BSCC). Several base stations may be probed with a CR to find the closest or the best base station. Based on this information from the CM, the user terminal, when it has data to transmit, can start a session, beginning with a random access registration request RA-rreq. If resources are available, the base station sends an Access Assignment AA to the user terminal assigning a traffic channel. The base station and user terminal exchange various access control parameters including encryption keys on this established stream. Finally a RID and PID are assigned. Using this RID, the user terminal can establish secure streams (e.g. RA-rts/AA-cts) in which it transmits and receives internet packets.

The traffic channel includes a data acknowledgement DA or a data invalid DI response to each transmitted data packet. The DA and DI messages are transmitted as a part of the next data packet from the recipient in the next slot. In a time division duplex frame, the base station and the user terminal alternate slots, as shown in Table 4. Accordingly, if any slots are not received properly, the data can quickly be retransmitted. This reduces the size of the data buffers at the respective base station and user terminal modems. As shown in Tables 3 and 4, uplink slots always precede downlink slots and there is a guard time between the two in order to allow for any synchronization errors or unanticipated propagation delays. In one embodiment, each side transmits data packets in three slots, each slot including ramp-up and ramp-down periods as well as synchronization bits as is well-known in the art.

TABLE 4

| 1 2 3 Uplink Slots | Guard Time | 1 2 3 Downlink Slots | Guard Time | 1 2 3 ... Uplink Slots |
|---|---|---|---|---|

Periodically, the user terminal scans the BCH to update its RSSI and BSCC map. When it detects a better base station, it may send a CR to this new base station and possibly handover its network session. If successful stream initiation fails too many times, the user terminal enters a timeout state. From timeout, it may try to regain a RID via RA-rreq, refresh its timing advance using a CR, find a new base station to which it might handover by scanning the BCH, or even begin from scratch to re-acquire basic frame timing. If this re-establishment is successful, the user terminal may be able to continue its network session by completing a network session handover to the new base station.

Channel Considerations

In one embodiment, the network is designed to take maximal advantage of spatial division multiple access technologies and particularly smart antenna array signal processing. To help maintain reliable spatial channels in an extremely dense frequency reuse pattern, the network uses time division duplex TDMA where uplink and downlink transmissions are always on the same frequency. In addition, because many user terminals are single antenna and transmit and receive omni-directionally, except for the BCH, an uplink burst is always received before a downlink burst needs to be sent. This allows downlink bursts to be more accurately spatially directed. An uplink training sequence is embedded in every uplink burst to allow for moderately fast frequency hopping despite any decorrelation of the spatial channel with frequency.

The frequency hopping sequence may be any one of many different sequences well-known in the art. The parameters of the frequency hopping scheme are initially unknown to the user terminal. This maximizes the flexibility of the network and increases the flexibility of the user terminal. As explained below, the frequency hopping parameters are transmitted to the user in the CM burst.

The robustness of the frequency hopping scheme and the traffic capabilities of the system are improved if more frequency carriers can be allocated to the frequency hopping scheme. The BCH carrier is included as part of the frequency hopping scheme and, accordingly, used as a traffic channel. Since any one base station transmits a BCH burst only once per frame and since traffic is spatially directed to a particular user, a base station can transmit traffic channel data bursts during another base station's BCH burst without significantly adding interference to user terminals that are listening for BCH bursts on neighboring channels. Normally, the user terminal to which the traffic data burst is directed will not be listening for BCH bursts because it is already in a traffic session.

Because in the present embodiment there are 128 base stations each assigned to a different slot of the BCH, it is unlikely that the $128^{th}$ portion of the BCH that is assigned to any one particular base station will overlap with a particular channel in the frequency hopping traffic channel scheme while that channel is being used for traffic. However, if it does, the base station broadcasts its BCH burst at its assigned time, listens for CR messages at its assigned time and transmits CM bursts in its assigned slot. This ensures further consistent operation of the network. For a user terminal, however, the use of the BCH carrier as a BCH will interrupt its traffic channel session. As a result, instead of receiving a data packet burst from the base station, it will receive the BCH burst.

Even if the user terminal does not recognize this burst as BCH, it will immediately recognize it as having an invalid format for the expected data packet. Accordingly, in the next uplink frame, it will send a data invalid DI message with its burst and the base station will send the earlier expected data packet in the next available frame in the traffic channel. In the present timing scheme, the same slot in the next frame will coincide with a Configuration Message slot for that base station. The same slot in the next frame will coincide with a different base station's assigned BCH slot. However, even if the second slot also overlaps with the base station's BCH assignment, the same protocol can apply again. The remote terminal will again send a DI message and after the assigned BCH slot has passed, the base station will send the expected data burst. By relying on the acknowledgment protocol, the data capacity of the network can be increased to include most of the BCH without increasing the complexity of the signaling or processing resources.

The amount of data capacity increase will depend on how much of the RF resources are dedicated to the BCH and how many base stations are in the system. If there are a small number of base stations in the system, so that the BCH frame has a very short repeat, the network can be configured so that every BCH slot is used for BCH, greatly reducing the amount of time for a remote user to acquire timing and synchronization and transmit a configuration request.

Alternatively, the BCH can be configured so that only a small number of the possible 128 slots are used for BCH bursts and the rest of the channel capacity is left open for traffic. If there are a large number (i.e. close to 128) of base stations in the network, then it is unlikely that a user terminal will be able to receive BCH bursts from more than ten percent of the possible base stations. As a result, the remaining ninety percent of the carrier can be used for data traffic without affecting new user terminals scanning for BCH bursts. The base station can be programmed with the BSID or BSCC of the nearby base stations so that it also will not transmit traffic during the BCH slots assigned to those base stations. The same DI, retransmit scheme described above will compensate for any conflicts between neighboring BCH slots and the traffic channel.

Configuration Request CR

CR bursts are distinguished from random access RA and traffic TCH bursts, in part, by a special CR spatial training sequence. The CR training sequence is longer than normal and has periodic properties that make finding timing alignment especially computationally efficient. The CR burst is shorter than a standard uplink data burst to allow for time-delay with unknown distance between the user terminal and base station. The CR burst is shortened by 86 μsec allowing an uncompensated time delay equivalent to a user terminal being about 15 km away from the base station.

The CR burst is transmitted from a user terminal at an unknown distance from the base station. Because of time-of-flight considerations, the user terminal time base is delayed relative to the base station. Furthermore, its CR transmission is also delayed because its timing advance is not yet initialized. Shortening the CR burst by 35 μsec allows it to arrive up to 35 μsec late without spilling over into the next time-slot. These 35 μsec mean that a user terminal 5300 meters from the base station can send a CR burst that will land completely within its time-slot. If this burst is seen by the base station, and replied to, the corresponding CM will contain a timing advance adjustment which will properly position subsequent data bursts.

Table 5 summarizes the content of the example CR burst. The 82 information symbols are constructed from the configuration request message using modulation and coding.

TABLE 5

| Duration | Contents |
| --- | --- |
| 10 μsec | ramp-up |
| 260 μsec | training symbols $a_1, a_2, \ldots, a_{130}$ |
| 164 μsec | information symbols $h_1, h_2, \ldots, h_{82}$ |
| 10 μsec | ramp-down |
| 86 μsec | extra guard time |
| 15 μsec | inter-burst guard time |

CR spatial training is the same for all base stations and the base station does not necessarily know the location of the user terminal before receiving the CR. CRs are transmitted by user terminals at a fixed offset from BCH transmissions as shown in Table 3. The resulting time-multiplexed registration channel easily distinguishes CRs sent to different ones of several nearby base stations. Furthermore, CR and CM are scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register. Finally the smart antenna spatial resolution ability of the base station is applied to resolve any remaining ambiguities in received CRs.

A configuration request message is mapped onto a configuration request burst CR by the physical layer. A configuration message is mapped onto a standard downlink burst by the physical layer. The information symbols of the present CR burst are mapped out as shown in Table 6. Any of the items listed below can be deleted and transmitted later during the registration cycle or not at all based on the needs of the system.

TABLE 6

Configuration Request Message

| Field | # of Bits |
|---|---|
| identity | 8 |
| utClass | 4 |
| txPwr | 5 |
| Total | 17 | identity is a set of unique random bits for each user terminal that differentiate simultaneous messages from multiple user terminals. Because of the randomness and large number of bits, it is unlikely that two user terminals will select the same identity code at the same time.

utClass identifies user terminal capabilities (highest modulation class, frequency hopping capabilities, etc. ) This sequence identifies the type of user terminal that sent the CR. A palmtop digital assistant might have different capabilities than a desktop computer with a fixed dedicated antenna. With utClass, the different capabilities can be distinguished.

txPwr represents the power used by the user terminal to transmit the Configuration Request burst. For example, user terminal power=(2 txPwr−30) dBm.

CR is sent on the control carrier, as an example, exactly 2265 μsec after receipt of a downlink BCH burst. In this way, an otherwise uninitialized user terminal can send CR without any knowledge of the frequency hopping sequence parameters. The CR burst is shorter than a standard uplink time-slot to allow for unknown time-of-flight from the user terminal to the base station and typically arrives late in the uplink time-slot receive window.

Configuration Message CM

Table 7 summarizes the content of an example Configuration Message burst. The 494 information symbols are constructed from the configuration message using modulation and coding.

TABLE 7

| Duration | Contents |
|---|---|
| 10 μsec | ramp-up |
| 68 μsec | training symbols $a_1, a_2, \ldots, a_{130}$ |
| 988 μsec | information symbols $h_1, h_2, \ldots, h_{494}$ |
| 10 μsec | ramp-down |
| 15 μsec | inter-burst guard time |

The configuration message CM burst is sent on the BCH carrier, exactly 5 msec after sending a downlink BCH burst, whenever CR was received on the corresponding uplink time-slot. Using this timing, CM is directed to the requesting user terminal. CM is also sent in a spatially directed signal based on the analysis of the spatial signaure, for example parameters, such as DOA and TOA of the uplink CR. Since CM is sent on the BCH carrier, a fixed time offset from BCH, an otherwise uninitialized user terminal can receive CM without any knowledge of the frequency hopping sequence parameters.

CM, in response to CR, includes, among other things; the AFN (Absolute Frame Number), a larger timing-advance adjustment dynamic range, coarser power control, and various access control parameters. Table 8, summarizes the content of the CM burst. Any of the items listed below can be deleted and transmitted later during the registration cycle or not at all based on the needs of the system.

TABLE 8

Configuration Message

| Field | # of Bits |
|---|---|
| identity | 8 |
| pwrCtrl | 4 |
| timingAdjust | 7 |
| AFN | 10 |
| carrierMask | 16 |
| racarrierMask | 16 |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: offset=(2 pwrCtrl−16) dB.

timingAdjust: timing advance that the user terminal should apply to future random access bursts: timing advance=timingAdjust μs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are nonzero.

raDec: AFNs available for random access channels. hopping: if equal to 1, the relationship between physical and logical carriers hops each frame.

Random Access-Request to Send Burst

As can be seen from the discussion above, after registration, the user terminal has a RID and a PID and a fair amount of information about the network, including all of the data listed in Table 5. This information includes an assigned random access channel or set of assigned random access channels and an initial transmit power level. This information is used in generating and sending the RA-rts.

After the user terminal has been registered with a particular base station, it can open a stream for a data exchange. The opening of a stream can be initiated by either the base station or the user terminal. Typically a stream will be opened if either the base station or the user terminal has data to send to the other. This data is buffered until a preset amount has accumulated in a transmit buffer or until a preset amount of time has elapsed. The preset amount can be any non-zero value. If the base station has accumulated transmit data in its buffer for the user terminal, then it will send a page, described in more detail below, to the user terminal. If the user terminal receives a page or if it has accumulated a sufficient amount of data in its transmit buffer, then it will send, for example, an RA-rts message. This message, as explained below, is a request that a stream be opened to allow the exchange of data. The base station upon receiving the RA message will analyze its system resource availability and if a suitable channel is available, then it will respond with, for example an AA-cts message. This message, as explained below, identifies a channel and assigns it for the stream.

With the RA/AA exchange, the stream is assigned and all the necessary information for the terminals to communicate has been exchanged. With the next uplink slot, the remote terminal will begin sending its data over the assigned channel. If the stream was initiated by a page from the base station, then the remote terminal may not have any data to send in which case it will send idle bits. The idle bits help the base station to maintain its spatial parameters for the user when there is no data received. The base station will use these spatial parameters to send its data packets or idle bits. In this way, data and acknowledgments are exchanged in the same way as for the registration stream.

Table 9 summarizes the content of an example Random Access Message burst. The burst structure is the same as an uplink data burst on a traffic channel TCH. For an uplink data burst, the information symbols carry data or in-and signaling or both.

TABLE 9

| Duration | Contents |
| --- | --- |
| 10 μsec | ramp-up |
| 146 μsec | training symbols $a_1, a_2, \ldots, a_{73}$ |
| 364 μsec | information symbols $h_1, h_2, \ldots, h_{182}$ |
| 10 μsec | ramp-down |
| 15 μsec | inter-burst guard time |

The RA burst information symbols, in one embodiment, have the fields as shown in Table 10.

TABLE 10

| Random Access Message | |
| --- | --- |
| Field | # of Bits |
| RAType | 3 |
| ID | 15 |
| UTTxPwr | 5 |
| Total | 23 |

The meanings of the symbol sets are as follows:

RAType: the type of the RA burst as described in association with Table 8.

ID: the registration identifier, either the RID or, for page responses, the PID. This field can be used by the base station to prioritize stream requests. User terminals with a higher priority can be identified by the RID or PID and be granted a stream in preference to other users. The ID is also used to access the registration account and information of the requesting user terminal.

UTTxPwr: the power used by the user terminal to transmit the burst. Any one of these fields may be deleted or modified and more fields may be added to suit particular applications.

The RAType field allows for there to be different types of RA messages sent on the same channel. Table 11 lists possible examples that can be supported with a three bit field. Further or different types of RA messages can be used depending upon the particular nature of the network. More bits can be used to allow for still more different types of messages. As an alternative, the user terminal may send a different RA burst depending on the circumstances as listed in Table 11. All of the RA bursts in Table 8 are sent on the random access channel assigned to the user terminal by the base station. In one embodiment, the RA channels are a set of channels that are also used for traffic.

TABLE 11

| Value | Symbol | Meaning |
| --- | --- | --- |
| 000 | RA-rts | stream request |
| 001 | RA-ping | keep-alive poll request |
| 010 | RA-rts-short | short stream request |
| 011 | RA-rts-directed | directed stream request |
| 100 | RA-page response | stream request due to page |
| 101 | RA-rts-UM | stream request, unacknowledged mode |
| 110 | RA-rreq | registration request |

The meanings of the symbol sets are as follows:

RA-rts will be discussed further below and is the mechanism with which the user terminal can open a new communications stream following registration.

RA-ping: can be used to alert the base station to the location, channel characteristics and activity of a user terminal without opening a stream. Pinging the base station can be used to keep a registration alive.

RA-rts short, -directed and -UM: can be used to open special types of streams.

RA-page response: can be sent when the user terminal has no data to transmit but is requesting that a stream be opened in response to a page from the base station. In some systems, it may be preferred that the base station open the stream directly without first paging the user terminal as discussed above.

RA-rreg: can be used to open a new registration or change an existing registration. As mentioned above, a user terminal uses the RA bursts after registration, however, it may be useful in network management for a single user terminal to have two registrations for different individuals, different accounts, different types of communications or other reasons.

Access Assignment Burst

The user terminal transmits any random access message such as RA-rts on the uplink side of the random access channel. The base station uses the downlink portion of the random access channel to grant random access requests and to assign resources to the requested data stream using an AA (Access Assignment) message. The AA message can have different formats. One format is shown in Table 12.

TABLE 12

Access Assignment Message

| Field | # of Bits |
|---|---|
| ID | 15 |
| AAType | 3 |
| modClassUp | 5 |
| modClassDown | 5 |
| frameDec | 3 |
| resource ibChan | 6 |
| pwrCtrl | 4 |
| timingAdjust | 5 |
| tOffset spChan | 3 |
| Total | 49 |

The meanings of the symbol sets are as follows:

ID: the id of the user terminal, either the RID or PID that was transmitted in the RA-rts.

modClassUp: identifies the modulation and coding used for the uplink.

modClassDown: identifies the modulation and coding used for the downlink.

frameDec: defines fractional rate channels.

resource ibChan: indicates the uplink/downlink resource pair that is assigned to the stream.

pwrCtrl: a power adjustment for the UT to apply to subsequent transmissions.

timingAdjust: a timing adjustment for the UT to apply to subsequent transmissions.

tOffset: training sequence offset adjustment for the UT to apply to subsequent transmissions.

AAType: indicates the type of Access Assignment message. Many different possible types are possible. Table 13 provides one example set of AA types.

TABLE 13

| Value | Symbol | Meaning |
|---|---|---|
| 000 | AA-cts | stream grant |
| 001 | AA-reject | request rejected |
| 010 | AA-ping-ack | keep-alive poll acknowledgment |
| 011 | AA-cts-short | short uplink grant |
| 100 | AA-cancel | cancel previous false page |
| 101 | AA-prev-short-ack | previous short uplink was successful |
| 110 | AA-invalid-ack | received RA is not valid |
| 111 | AA-req-ack | registration grant |

The meanings of the symbol sets are as follows:

AA-cts: (Access Assignment-clear-to-send) begins a stream with the sending user terminal based on the parameters in the AA-cts message. An AA-cts can be sent in response to any of the RA messages and is particularly appropriate for RA-rts, RA-ping, RA-rts-directed, RA-page-response, and RA-rreg. This allows the base station to open a stream even if the user terminal was not aware of the need to open a stream. The next communication will be data in the opened stream. As mentioned above, data will be transferred until the corresponding stream data buffers are emptied. Typically the stream is then closed. However, the stream may be closed upon the occurrence of many other events as well.

AA-reject: can be used to reject the request and direct the UT to start a timer before sending an RA message. Such a response can relieve congestion on a busy base station. The UT in response may elect to wait or to send an RA-rts to another base station that has better traffic availability.

AA-ping-ack: acknowledges the RA-ping and resets the timers for the registration. The pinging process can be used to prevent a registration from expiring for lack of traffic. Maintaining the registration allows a stream to be opened immediately with e.g. an RA-rts and an AA-cts. If the registration expires then the registration process must be repeated before a data stream can be opened.

AA-cts-short, and AA-prev-short-ack: can be used for special types of streams.

AA-cancel: can be used to respond to an RA-page-response when no page was sent or the paging condition no longer applies.

AA-invalid-id: can be used to notify the UT that it is using a RID or PID that has expired or is not valid with the responding base station. The UT can use the information in the AA to request that a new registration stream be opened by sending e.g. RA-rreq.

AA-reg-ack: is the acknowledgment of RA-rreq that begins a registration stream.

As mentioned above, the base station can send a page to the UT directing the UT to send an RA-page-response message to the base station. In one embodiment, this reduces the control traffic overhead by using a paging channel. The paging channel can be efficiently utilized by the base station and the page can allow random access channel assignments that increase the channel efficiency of establishing the desired data stream. The page bursts are transmitted on a paging channel which may be used exclusively for pages or it may be shared with other functions such as a broadcast channel or a control channel. Alternatively a section of a traffic channel can be used for pages.

Pages will contain an indication of the base station sending the page and of the user terminal being paged, typically the PID. If the UT is already registered then the page does not need to also include any information about how to respond to the page because this information can be included in the registration data exchange stream. In the embodiment discussed above, the UT will respond to a page in the random access channel by sending a RA-page-response message, however other types of responses are also possible.

Traffic Channel Burst Structure

In one embodiment, a user terminal forms a relationship with a base station called a registration or session. This registration begins by listening to a BCH (Broadcast Channel) and ends with a handover, timeout, or disconnection. The first step of registration is accomplished by a user terminal by sending a CR (Configuration Request) burst and receiving a CM (Configuration Message) burst. As described above, the CM contains basic configuration parameters such as hopping sequence calculation parameters. Using the information from the CM, the user terminal then opens an unauthenticated registration stream. During the registration stream, identities and capabilities are exchanged, operating parameters are set, and a RID (Registration Identifier) and PID (Paging Identifier) are assigned. Later, streams may be created and attached to this RID, or PID, and operating parameters. The specific details of registration are not provided here. Many other registration scenarios are also possible within the scope of the present invention.

The CM contains sufficient information for the user terminal to learn its distance and RF path-loss to the base station, correct its timing advance, adjust its power control, and learn the parameters of frequency hopping (e.g. frame numbering and BSCC. Based on this information from the CM, the user terminal, when it has data to transmit, can start a session, beginning with a RA-rreq (Random Access—registration request). If resources are available, the base station sends an AA—reg-ack (Access Assignment—registration-acknowledgment) to the user terminal assigning a traffic channel for the registration process. The base station and user terminal exchange various access control parameters including encryption keys on this established stream. Finally a RID and PID are assigned. Using a RID or PID, the user terminal can establish secure streams in which it transmits and receives data packets on a TCH.

In spatial diversity radio communications systems, the present invention allows communications on the traffic channel (TCH) to start with reasonably accurate timing, frequency, and spatial diversity parameters. Beginning with more accurate parameters avoids the added latency of using several frames to gradually determine channel information. In one embodiment, the user terminals transmit omni-directionally from a single antenna and the base station uses spatial diversity antennas to receive and transmit using spatial diversity parameters. This allows signals transmitted on the same channel from e.g. different locations to be resolved and it allows the base station to send different signals to different user terminals on a single frequency. The registration process includes enough signaling for the base station to develop an accurate set of timing, frequency, and spatial parameters for sending any pages. However, in one embodiment, pages are sent in all directions, in case the user terminal has moved after registration or radio channel conditions have changed. In addition, as described above, the uplink random access bursts also have a fairly long training sequence. This allows the base station to refine the prior spatial processing parameters in the event that the user terminal has moved or the channel has changed.

A traffic channel (TCH) burst is transmitted by a user terminal or a base station in order to send traffic over the traffic channel. In one embodiment, TCH bursts are transmitted with idle bits when there is no data to transmit in order to maintain timing and spatial parameters. It is transmitted after CR and CM have been exchanged, after registration and after a stream has been opened on an assigned channel for data traffic. Accordingly, timing and frequency offset, as well as spatial signatures are already reasonably well-established. In one embodiment, timing is known to less than plus or minus two symbol times.

The TCH burst is composed of several fields which are listed in Table 14. The durations are described in terms of microseconds. In one embodiment, a symbol period is 2 microseconds and the uplink and downlink bursts differ as shown. Alternatively, the bursts may be structured so that the uplink and downlink bursts have the same structure. The network may also be a network of peers so that uplink and downlink cannot be defined.

TABLE 14

Traffic Channel (TCH) Burst fields

| Duration Uplink | Duration Downlink | Contents |
| --- | --- | --- |
| 10 μsec | 10 μsec | ramp-up |
| 146 μsec | 68 μsec | training symbols (73, 34) |
| 364 μsec | 988 μsec | information symbols (182, 494) |
| 10 μsec | 10 μsec | ramp-down |
| 15 μsec | 14 μsec | inter-burst guard time |

The training symbols are allocated 146 or 68 microseconds which corresponds to 73 or 34 symbols in order to allow the signal to be more accurately received and demodulated in the event that there has been any drift or movement between terminals. The training symbols are discussed in more detail below.

The 364 or 494 information symbols are constructed from the transmit data buffers. In the present embodiment, the TCH burst can be modulated in a variety of ways in order to increase data capacity of the system.

Training Sequences

For the TCH burst, timing and frequency offset are already reasonably well known due to the earlier exchange of CR and CM and registration. As a result, the training sequences can be simpler. For the uplink burst, the training sequence symbols are selected by the user terminal based on the BSCC and a value assigned to the user terminal by the base station. This allows bursts from different user terminals to be identified and distinguished from one another. The core sequence can alternatively be selected based on a serial number, product number, ID number or other stored number of the user terminal. In one embodiment, the training sequence has three parts, a 5 symbol prefix, a 63 symbol core and a 5 symbol suffix. The prefix is made up of the last 5 symbols of the core and the suffix is made up of the first 5 symbols of the core. The downlink training sequence is constructed similarly but has only a 24 symbol core for a total of 34 symbols. The particular length and symbol set for the training sequence is not important to the present invention, provided that the sequence is known. Many different configurations for the training sequence are possible. Similarly, it is not necessary to distinguish uplink and downlink sequences. However, for simplicity, the present invention shall be illustrated using the example of the 73 symbol uplink training sequence discussed above.

In use, the particular sequences are typically generated using a look-up table. The values in the table are selected based on autocorrelation, cross correlation, periodicity and similar properties. The bounds on auto and cross correlations help to make delayed versions of these sequences to appear partially uncorrelated to a least squares beamformer which resolves them.

Standard Unlink and Downlink Burst

As can be seen from the description above, several different bursts have the same structure. So, for example, in the uplink, the RA burst (Table 9) and the TCH burst (Table 14) have the same structure. Even the CR burst (Table 5) has a training sequence that starts at the same symbol position. For the downlink, the CM burst (Table 7), AA burst, and TCH burst (Table 14) all have the same structure. As a result, any of the listed downlink bursts can be sent in any downlink slot of the frame described above. Bursts of a particular type can be directed to a particular group of time slot and frequency resources or the bursts can be mixed. For example, a particular frame or some other grouping of time slot and frequency resources can be designated as a control channel and carry only CR, CM, RA and AA bursts. Another set of resources can be designated as a traffic channel and carry only TCH bursts. Alternatively, as described above, the slots of a broadcast channel frame can be used for broadcast, control, random access and traffic channels. In addition, the slots of any frame can be used to carry messages of the broadcast, control, random access and traffic channels.

The bursts described herein are intended as examples only and more or fewer types of bursts can be used. The bursts can be classified in a variety of different ways and grouped into logical channels. As one example, the system can be characterized as having a broadcast channel BCH, control channel CCH and a traffic channel TCH. In this system the BCH has only BCH bursts and the TCH has only TCH bursts. The CCH includes the CR, CM, RA, AA, and Page (PCH) bursts. The system can also be characterized as having a broadcast channel BCH, configuration channel CCH, random access channel RACH, and traffic channel TCH. According to this taxonomy, the CR and CM belong to the CCH while the RA, AA and PCH belong to the RACH. The present invention does not depend on how bursts are characterized and can be applied to a wide range of different communications systems.

The common structure of the bursts allows any burst to be sent in any slot. Except for the broadcast channel, all of the bursts have a training sequence in the same symbol position and almost all of the bursts have the exactly the same structure. As a result, the bursts can all be demodulated in exactly the same way. Once the information symbols are demodulated they can be passed to higher layers for appropriate use. This consistency in the burst structures provides for more flexibility in the resource allocation of the system.

In one embodiment, the burst structures can be characterized as a standard uplink burst and a standard downlink burst. The standard uplink burst can be used for RA and TCH bursts, carrying the same information as discussed above. The standard downlink bursts can be used for CM, AA and TCH, carrying the information as discussed above. Pages can also be transmitted in the standard downlink burst. The bursts can be structured as described above, or alternatively as shown in Table 15. This burst structure is depicted also in the diagrams of FIGS. 1 and 2. The standard bursts of Table 15 have less training than the burst described above, but also include a FACCH (fast associated control channel) which can be used to transmit control and overhead data of any kind. In some systems, the FACCH can be used for messages regarding handovers. In other systems, the FACCH can be used for messages regarding modulation class or channel quality changes. As with the structures above, each symbol takes 2μsec. Also as with the structures above, variations and modifications can be made to suit specific implementations.

TABLE 15

Standard Burst (SUL, SDL) fields

| Duration Uplink | Duration Downlink | Contents |
|---|---|---|
| 10 μsec | 10 μsec | ramp-up |
| 114 μsec | 68 μsec | training symbols (73, 34) |
|  | 32 μsec | FACCH (16) |
| 364 μsec | 920 μsec | information symbols (182, 460) |
| 32 μsec |  | FACCH (16) |
|  | 36 μsec | training symbols (18) |
| 10 μsec | 10 μsec | ramp-down |
| 15 μsec | 14 μsec | inter-burst guard time |

FIG. 1 shows an uplink burst of 545 μsec, the components of which are a short 10 μsec ramp up 101, and a 68 μsec training sequence 102. The training sequence can be selected in many different ways as described above. For example, it can be selected from a list of orthogonal training sequences based on the nature of the burst, an identification of the transmitting terminal or the receiving terminal or an assignment from the transmitting or receiving terminal. In one embodiment, the training sequences are grouped based on the tOffset value described above. For control channel messages (CR, CM, RA, AA) one or two tOffset values are permitted and the rest of the tOffset values are used for traffic channel (TCH) bursts. The selected training sequence is then modified or constructed by taking the selected sequence and applying a function of the base station or user terminal ID.

These sections are followed by 364 μsec of information symbols 103 and a 32 μsec FACCH 104. The information symbols will depend on the nature of the burst and can be registration, request, control or user data among others. The burst closes with a 10 μsec ramp-down 105 and a 15 μsec interburst guard time 106. In the frame structures of the present invention, the interburst guard time will be followed either by another ramp-up for the next burst, a transition guard time preceding downlink bursts or an interframe guard time.

Figure 2:
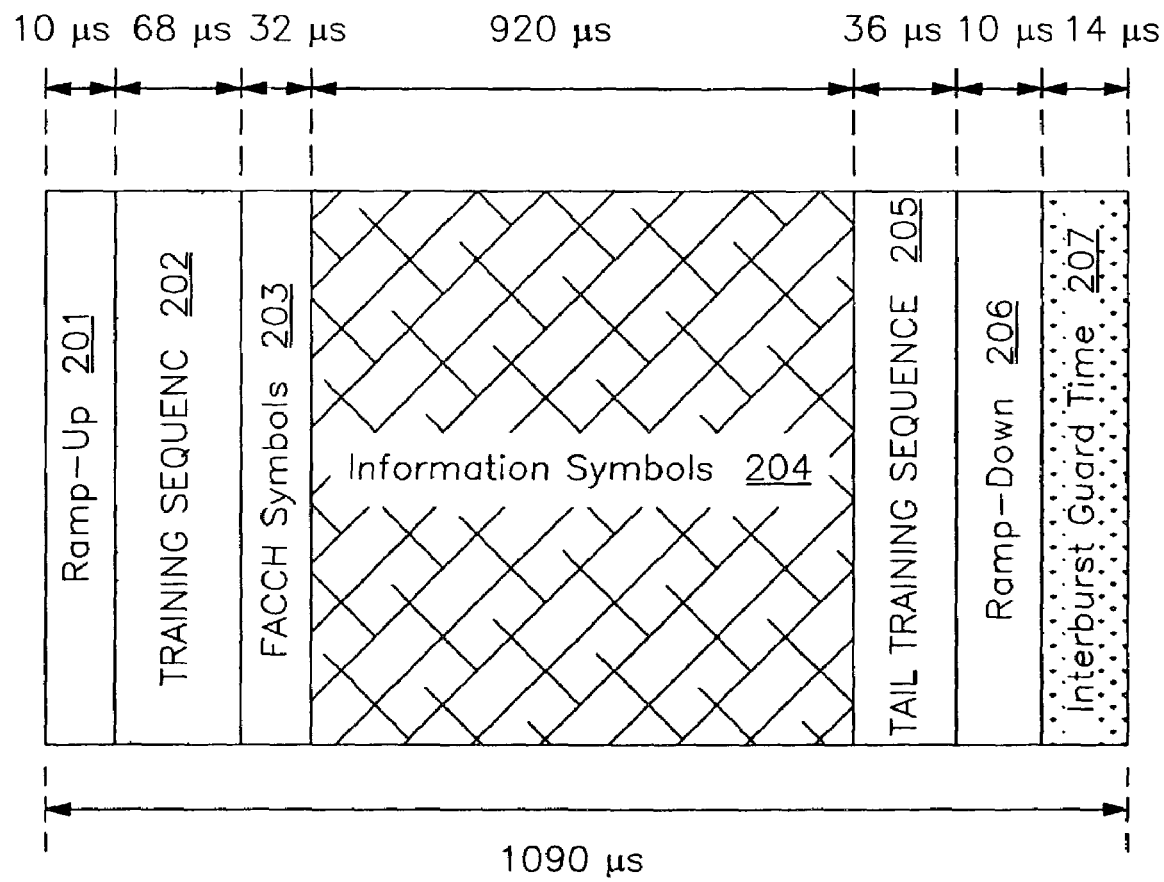
FIG. 2 is a diagram illustrating an example of a standard downlink slot structure according to one embodiment of the present invention.

Similarly, FIG. 2 shows a standard downlink burst of 1090 μsec, the components of which are a short 10 μsec ramp up 201, a 68 μsec training sequence 202, and a 32 μsec FACCH 203. The training sequence can be selected in any of the different ways as described above or others. These sections are followed by 920 μsec of information symbols 204. The information symbols will depend on the nature of the burst and can be registration, assignment, control or user data among others. The burst closes with a 36 μsec tail training sequence 205, a 10 μsec ramp-down 206 and a 14 μsec interburst guard time 207. In the frame structures of the present invention, the interburst guard time will be followed either by another ramp-up for the next burst, a transition guard time preceding downlink bursts or an interframe guard time.

The tail training sequence aids in maintaining timing and frequency during the longer information symbol set. The training sequences at either end provide two advantages. First, the greater distance between the training sequences allows for a more accurate determination of the frequency or phase offset during any burst. Second, by placing the training sequences at opposite ends of and outside of the information symbols, the accurate frequency offset from the training sequences can be applied to the information symbols by interpolation. In some systems, all the training or additional training is placed in the middle of the information symbols. This requires an extrapolation in order to determine the timing at the end of the information symbols. Extrapolation is inherently less accurate than interpolation. The tail training sequence may be the same as or different from the first training sequence. If the first training sequence is a repetition of some core sequence, then the tail training sequence can be identical but with fewer repetitions. Alternatively, the tail training sequence can be a truncated variation of the first training sequence.

Traffic Channel Frame Structure

As described above, the frame structure can support broadcast, control, random access and traffic channel bursts. All of the bursts described above can be used in the frame. An example of such a frame is shown, for example in Table 4 above. This frame is described in further detail with respect to Table 16 and FIG. 3.

TABLE 16

Standard Frame fields

| Duration Uplink | Duration Downlink | Duration System | Contents |
|---|---|---|---|
| 545 μsec |  |  | slot #1 |
| 545 μsec |  |  | slot #2 |
| 545 μsec |  |  | slot #3 |
|  |  | 10 μsec | transition guard time |
|  | 1090 μsec |  | slot #1 |
|  | 1090 μsec |  | slot #2 |
|  | 1090 μsec |  | slot #3 |
|  |  | 85 μsec | inter-frame guard time |

Figure 3:
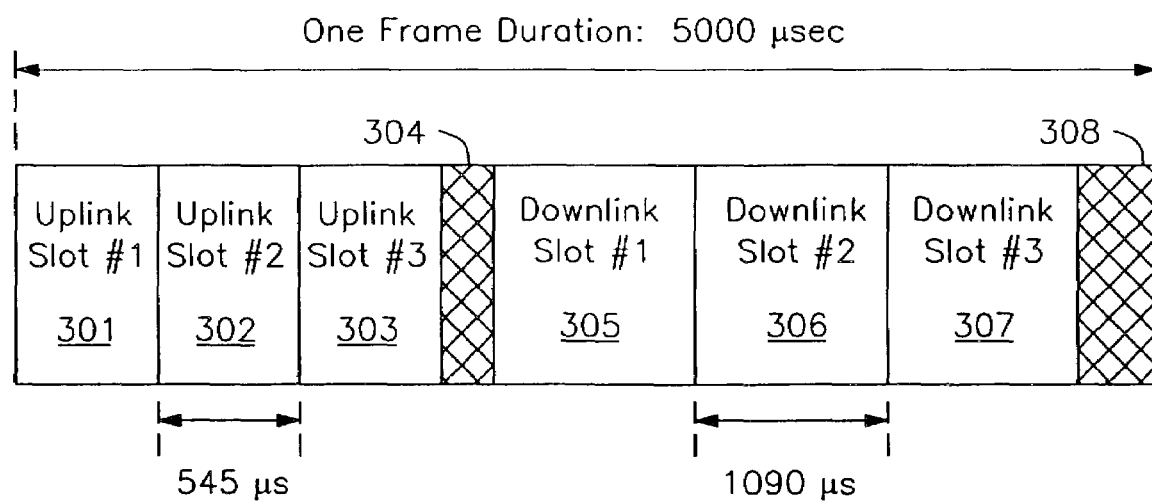
FIG. 3 is a diagram illustrating an example of a repeating frame structure according to one embodiment of the present invention.

The example frame of FIG. 3 has three adjacent 545 μsec uplink slots 301, 302, 303, in a single time sequence. The uplink slots are followed by a sequence of three adjacent 1090 μsec downlink slots 305, 306, 307. In FIG. 3, there is no gap between each uplink slot nor between each downlink slot, however, as shown in FIGS. 1 and 2, each slot includes an interburst guard time. This interburst guard time can instead be characterized as belonging to the frame and not to the slot, in which case there is a gap between each slot. In addition, between the uplink slots and the downlink slots an additional 10 μsec uplink to downlink transition time is provided. This time can be used by terminals to switch between receive and transmit modes or transmit and receive modes.

An 85 μsec interframe guard time is provided after the downlink slots. The length of this as well as any of the other guard times can be modified to suit any particular implementation of the present invention. The interframe guard time helps a receiving remote user terminal. After the bursts of downlink slot #3 are transmitted, there will be a propagation time delay before the bursts have traveled past a particularly distant remote receiver that is communicating with the base station. Following the third downlink slot, uplink bursts will be transmitted. These can be transmitted with a timing advance so that they are received by the base station within the appropriate uplink slot of the frame. For the most remote user terminals a significant timing advance may be applied. These remote slot #1 uplink bursts can interfere with the base station's slot #3 downlink bursts unless a sufficient guard time is provided. 85 μsec provides a range of up to 15 km between the base station and the most remote user terminals. 85 μsec is considered appropriate for the present example but may be increased or decreased based on expected base station ranges as well as other factors.

While the example of Table 16 shows that the uplink slots always precede downlink slots, the ordering may be reversed. As can be seen from Table 3, in a repeating frame, if the downlink slots are before the uplink slots in a frame, then those downlink slots will still follow the uplink slots of the previous frame. In addition, the frame is shown as having the uplink and downlink slots, respectively, adjacent to each other. Alternatively, the uplink and downlink slots can alternate or be grouped in some other way. The ordering of uplink and downlink slots described above simplifies the operation of the network and reduces demands on base station and user terminal performance. It also requires less guard time than many other frame structures. Finally, the uplink and downlink slots are shown as being equal in number. This configuration works well for two-way communications in a traffic channel but can be modified to suit particular system demands. For example, as shown in Table 3, broadcast channel bursts may be added to the frame in any selected location. For some systems, it may be preferred to designate an additional uplink or downlink slot for system information, data transmitted to many users or to more completely compensate for asymmetry in data traffic demands.

FIG. 3 further shows that the downlink slots are twice as long as the uplink slots and, accordingly, twice as many symbols can be transmitted. Specifically, as shown in FIGS. 1 and 2 and Table 15, an uplink burst carries 182 information symbols, while a downlink burst carries 460 information symbols or about 2.5 times more symbols. In the traffic burst of Table 14, the uplink carries 182 information symbols and the downlink 494 or about 2.7 times more information symbols in the downlink. The actual data rate of the uplink and downlink bursts are determined in part by the number of information symbols transmitted and also, in part, by the modulation class used for the uplink and downlink transmissions.

Modulation Classes

As described above, some of the messages communicated between the base station and the user terminal including utClass, modClassUp, and modClassDown can be used to set or change the modulation class used for transmitting uplink and downlink bursts. Alternatively, the FACCH or another message can be used to set or adjust the modulation class used. The modulation classes provide different types of modulation and coding which together vary the number of bits per symbol. The modulation classes can be selected based on terminal capabilities, channel quality or a variety of other factors. They can be changed in any number of different ways. The particular number and type of modulation classes can take many different forms as appropriate to accommodate network capacities, channel quality and cost targets.

In one embodiment, there are 9 different modulation classes as shown in Table 17. The different modulation classes differ in modulation scheme as well as in encoding. The encoding can include error detection and correction, puncturing, block coding and block shaping. Other types of modulation and encoding can be used depending on the needs of a particular application. The bit per symbol rates are approximate in Table 17 but provide an indication of a range of data rates that can be accomplished using the same number of symbols. Using the values in Table 15 of 182 uplink and 460 downlink information symbols per burst, a modulation class 0 burst would carry 91 or 230 bits, respectively. A modulation class 8 burst on the other hand carries 728 and 1840 bits, respectively.

TABLE 17

Modulation Classes

| ModClass | Bits/Sym | Bits/Uplink Burst | Bits/Downlink Burst | Signal Set |
|---|---|---|---|---|
| 0 | .5 | 91 | 230 | BPSK |
| 1 | .67 | 121 | 308 | BPSK |
| 2 | 1 | 182 | 460 | QPSK |
| 3 | 1.5 | 273 | 690 | QPSK |
| 4 | 2 | 364 | 920 | 8-PSK |
| 5 | 2.5 | 455 | 1150 | 8-PSK |
| 6 | 3 | 546 | 1380 | 12-QAM |
| 7 | 3.5 | 637 | 1610 | 16-QAM |
| 8 | 4 | 728 | 1840 | 24-QAM |

The modulation classes can also be adjusted to achieve a particular data rate ratio between uplink and downlink as well as to accommodate the greater capabilities of a base station as compared to a remote terminal. The ratio of downlink symbols per uplink symbol is approximately 2.5:1. This is believed to be a practical data rate ratio for many Internet applications. If the base station and the user terminal use the same modulation class, then the data rate ratio will also be about 2.5:1. However, by using different modulation classes, the data rate ratio can be varied between about 0.32:1 (UT at modclass 8, BS at modclass 0) to about 20:1 (UT at modclass 0, BS at modclass 8). In some applications, the BS will frequently transmit user data using a modulation class that is one step higher than the modulation class of the user terminal. This provides a data rate ratio of from 2.9:1 to 3.8:1. As can be seen, the modulation classes provide a great amount of flexibility in setting the operating parameters of the system.

The lower modulation classes require less energy to transmit and cause less interference with other users at the same base station. Accordingly, the system can be configured to prefer lower modulation classes. On the other hand, the higher modulation classes transmit at higher data rates so that data buffers will be emptied sooner. For many types of data transfer, the higher data rate will mean shorter sessions so that more users can be accommodated. If a user is sending and receiving e-mail, for example, a higher data rate will transfer the e-mail faster, so that the session can be closed and the system resources made available to another user. The selection of modulation classes may depend not only on the amount of data to be transferred but the relative amount in each direction. If the data to be transferred in one direction is much less than the data to be transferred in the other direction, then the direction with the lesser amount of data can be operated at a much lower modulation class. Since the session will remain open until the larger data buffer is empty, this will not delay closing the session.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. Nos. 5,828,658, issued Oct. 27, 1998 to Ottersten et al. and U.S. Pat. No. 5,642,353, issued Jun. 24, 1997 to Roy, III et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

Figure 4:
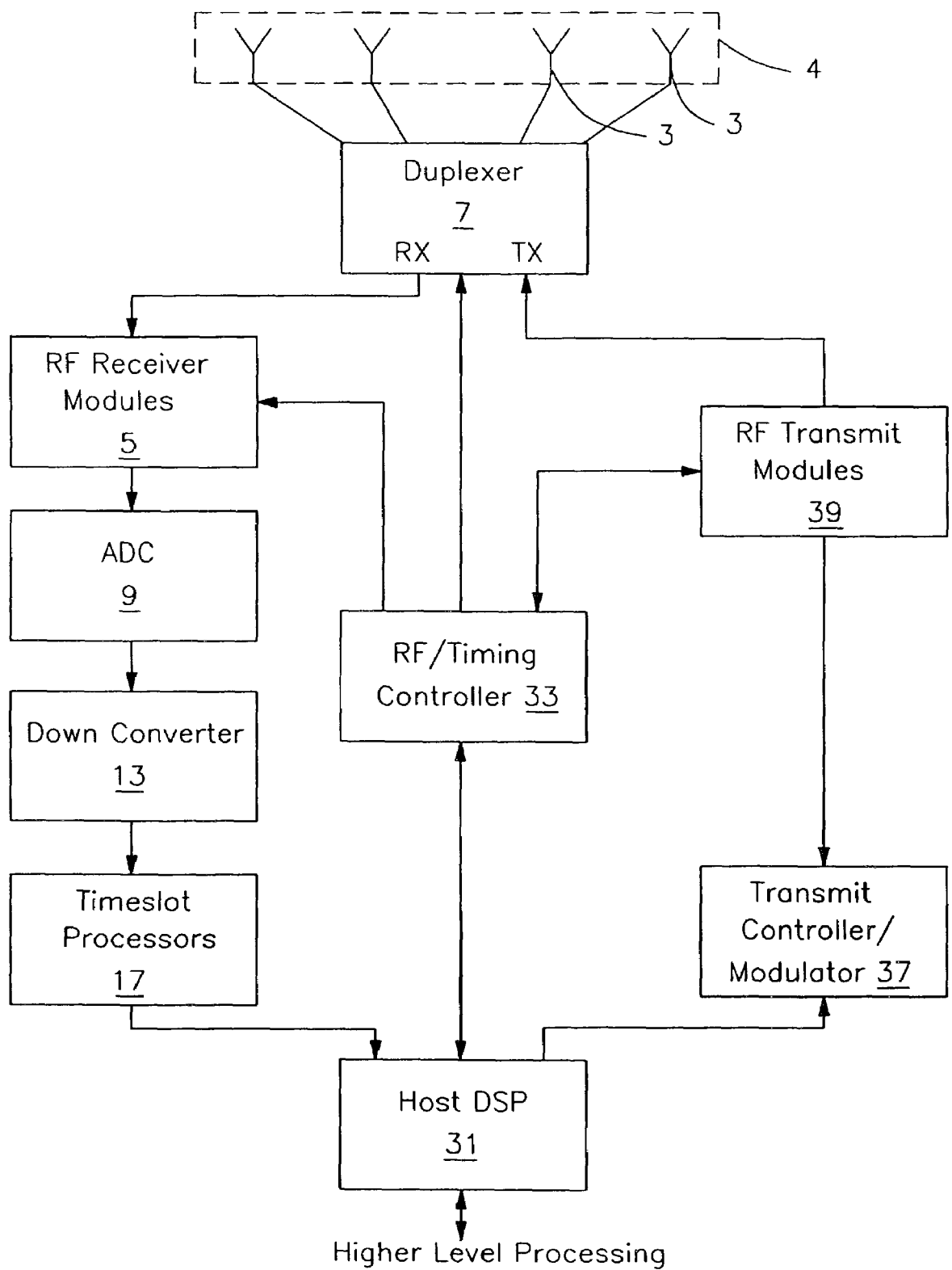
FIG. 4 is a simplified block diagram of a base station on which an embodiment of the invention can be implemented.

FIG. 4 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 5. The base station may be connected to a wide area network (WAN) through its host DSP 31 for providing any required data services and connections external to the immediate wireless system.

To support spatial diversity, a plurality of antennas 3 is used to form an antenna array 4, for example four antennas, although other numbers of antennas may be selected. Each antenna is an element of a four-element array 4. The antenna elements may have a spacing of from one-quarter to four wavelengths of a typical carrier. In many applications, the spacing between antenna elements of each array can be less than two wavelengths of the received signal. In general, the spacing between elements in an array is selected to minimize grating lobes when transmissions from each element are coherently combined. As mentioned above, it is also possible for each array to have only a single element.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

Figure 5:
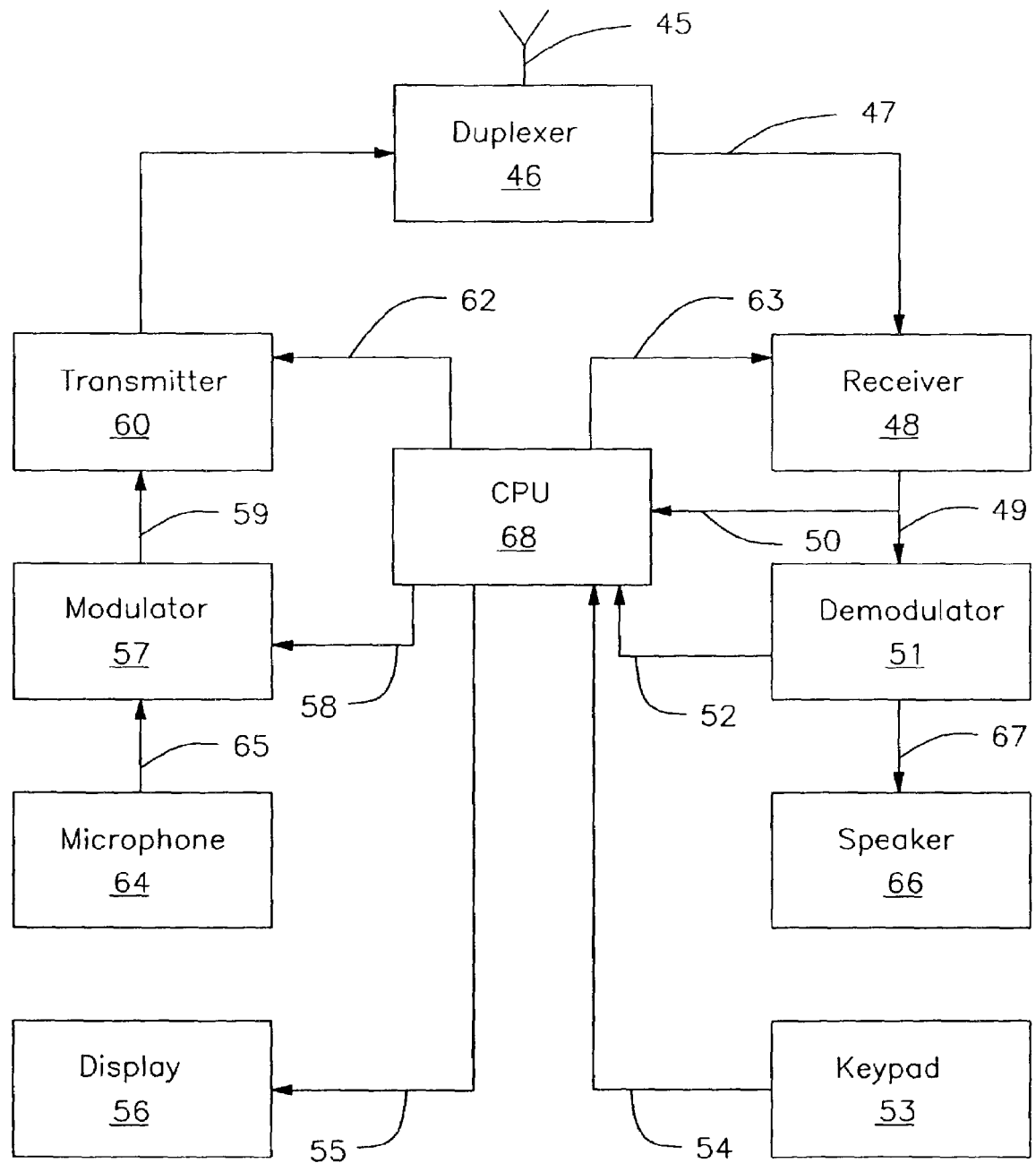
FIG. 5 is a block diagram of a remote terminal on which an embodiment of the invention can be implemented.

FIG. 5 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 4 and 5, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A radio of a time division radio communications system comprising a transceiver for communicating with other radios of the time division radio communication system over radio channels using a preestablished time division frame structure, the preestablished frame structure comprising:
   a sequence of uplink slots each having a predetermined duration, the uplink slots being for use at least in part in determining spatial parameters for use in receiving subsequent uplink slots from the corresponding uplink transceiver;
   a sequence of downlink slots following the sequence of uplink slots, each downlink slot being associated with an uplink slot, each downlink slot having a predetermined duration that is greater than the duration of each of the uplink slots of the sequence, the downlink slots being for use in sending data to the corresponding uplink transceiver using the determined spatial parameters from the preceding uplink slots of the same frame;
   an interburst guard time between each uplink slot;
   an interburst guard time between each downlink slot; and
   an interframe guard time after the sequence of downlink slots.

2. The radio of claim 1, wherein at least one of the uplink slots has a different transmission modulation format than the other uplink slot.

3. The radio of claim 1, wherein the uplink slots of the sequence are adjacent.

4. The radio of claim 1, wherein at least one of the downlink slots has a different transmission modulation format than the other downlink slots and the same modulation format as the associated uplink slot.

5. The radio of claim 1, wherein the downlink slots of the sequence are adjacent.

6. The radio of claim 1, wherein an interburst guard time follows each slot.

7. The radio of claim 1, wherein the interframe guard time precedes the sequence of uplink slots.

8. The radio of claim 1, wherein the sequence of uplink slots comprises three adjacent uplink slots.

9. The radio of claim 8, wherein the sequence of downlink slots comprises three adjacent downlink slots, the sequence of downlink slots following the sequence of uplink slots.

10. The radio of claim 9, further comprising a transition guard time between the sequence of uplink slots and the sequence of downlink slots.

11. The radio of claim 1, wherein the downlink slots are adapted to carry any one of traffic, control and broadcast channel traffic.

12. The radio of claim 1, wherein the control channel traffic comprises, paging, channel assignment and system configuration messages.

13. The radio of claim 1, wherein the uplink slots are adapted to contain any one of traffic, random access and control channel traffic.

14. The radio of claim 1, wherein each interburst guard time has a duration of less than two percent of the duration of an uplink slot.

15. The radio of claim 1, wherein the interframe guard time has a duration of less than sixteen percent of the duration of an uplink slot.

16. The radio of claim 1, wherein each interburst guard time has a duration of less than twelve percent of the interframe guard time.

17. The radio of claim 1, wherein the downlink slots have a duration that is at least twice the duration of the uplink slots.

18. The radio of claim 1, wherein the interframe guard time is at the end of the frame.

19. A method comprising:
receiving bursts in a sequence of uplink slots of a repeating frame, each uplink slot having a predetermined duration, the uplink bursts each being separated by an uplink interburst guard time;
using the received bursts to determine a set of spatial parameters for each received burst;
transmitting bursts in a sequence of downlink slots of the repeating frame after receiving the bursts in the sequence of uplink slots using the determined spatial parameters from the preceding uplink slots of the same frame, each downlink slot having a predetermined duration that is greater than the duration of the uplink slots, each downlink slot being associated with an uplink slot, the downlink bursts each being separated by a downlink interburst guard time;
waiting for an interframe guard time after the sequence of downlink bursts; and repeating the frame.

20. The method of claim 19, wherein at least one of the uplink slots has a different transmission modulation format than the other uplink slots.

21. The method of claim 19, wherein the uplink slots of the sequence are adjacent.

22. The method of claim 19, wherein a downlink slot has a different modulation format than the other downlink slots and the same modulation format as the associated uplink slot.

23. The method of claim 19, wherein the downlink slots of the sequence are adjacent.

24. The method of claim 19, wherein the interframe guard time precedes the sequence of uplink slots.

25. The method of claim 19, wherein the sequence of uplink slots comprises three adjacent uplink slots.

26. The method of claim 25, wherein the sequence of downlink slots comprises three adjacent downlink slots, the sequence of downlink slots following the sequence of uplink slots.

27. The method of claim 26, further comprising waiting for a transition guard time between the sequence of uplink slots and the sequence of downlink slots.

28. A computer-readable medium having stored thereon data representing instructions which, when executed by a computer, cause the computer to perform operations comprising:
receiving bursts in a sequence of uplink slots of a repeating frame, each uplink slot having a predetermined duration, the uplink bursts each being separated by an uplink interburst guard time;
using the received bursts to determine a set of spatial parameters for each received burst;
trailsmitting bursts in a sequence of downlink slots of the repeating frame after receiving the bursts in the sequence of uplink slots using the determined spatial parameters from the preceding uplink slots of the same frame, each downlink slot having a predetermined duration that is greater than the duration of the uplink slots, each downlink slot being associated with an uplink slot, the downlink bursts each being separated by a downlink interburst guard time;
waiting for an interframe guard time after the sequence of downlink bursts; and
repeating the frame.

29. The medium of claim 28, wherein the instructions for receiving are executed before the instructions for transmitting.

30. The medium of claim 28, wherein the uplink slots of the sequence are adjacent.

31. The medium of claim 28, wherein the downlink slots of the sequence are adjacent and use different modulation formats.

32. The medium of claim 28, wherein the instructions further comprise instructions which, when executed by the computer, cause the computer to perform further operations comprising waiting for a transition guard time between the sequence of uplink slots and the sequence of downlink slots.

33. A method comprising:
transmitting a burst in a predetermined one of a sequence of uplink slots of a repeating frame, each uplink slot having a predetermined duration, the uplink burst being separated from other uplink bursts by an uplink interburst guard time, the uplink burst being used at least in part in determining spatial parameters for a corresponding subsequent downlink burst;
receiving a burst in a predetermined one of a sequence of downlink slots of the same repeating frame after transmitting the uplink burst, the downlink burst being received in accordance with the determined spatial parameters from the preceding uplink burst of the same frame, each downlink slot having a predetermined duration that is greater than the duration of the uplink slots, each downlink slot being associated with an uplink slot, the downlink burst being separated from other downlink bursts by a downlink interburst guard time;
waiting for an interframe guard time after the sequence of downlink bursts; and
repeating the transmitting and receiving.

34. The method of claim 33, the transmitted uplink bursts has a different transmission modulation format than burst in the other uplink slots of the frame.

35. The method of claim 33, wherein the uplink slots of the sequence are adjacent.

36. The method of claim 33, wherein the downlink burst has a different modulation format than the other downlink bursts and the same modulation format as the associated uplink burst.

37. The method of claim 33, wherein the downlink slots of the sequence are adjacent.

38. The method of claim 33, wherein the interframe guard time precedes the sequence of uplink slots.

39. The method of claim 33, wherein the sequence of uplink slots comprises three adjacent uplink slots.

40. The method of claim 39, wherein the sequence of downlink slots comprises three adjacent downlink slots, the sequence of downlink slots following the sequence of uplink slots.

41. The method of claim 40, further comprising waiting for a transition guard time between the sequence of uplink slots and the sequence of downlink slots.

42. An apparatus comprising:
a receiver to receive bursts in a sequence of uplink slots of a repeating frame, each uplink slot having a predetermined duration, the uplink bursts each being separated by an uplink interburst guard time;

a processor to determine a set of spatial parameters for the received uplink bursts;

a transmitter to transmit bursts in a sequence of downlink slots of the same repeating frame using the determined spatial parameters from the preceding uplink slots of the same frame, each downlink slot having a predetermined duration that is greater than the duration of the uplink slots, each downlink slot being associated with an uplink slot, the downlink bursts each being separated by a downlink interburst guard time; and the processor further to determine the duration of the interburst guard times and to suspend operation of the receiver and transmitter for an interframe guard time after the sequence of downlink bursts.

43. The apparatus of claim 42, at least one of the uplink slots having a different transmission modulation format than the other uplink slots and the same modulation format as the associated downlink slot.

44. The apparatus of claim 42, wherein the interframe guard time precedes the sequence of uplink slots.

45. The apparatus of claim 42, wherein the sequence of uplink slots comprises three adjacent uplink slots, the sequence of downlink slots comprises three adjacent downlink slots.

46. The apparatus of claim 42, wherein the processor further suspends operation of the receiver and transmitter for a transition guard time between the sequence of uplink slots and the sequence of downlink slots.

47. An apparatus comprising:

a transmitter to transmit a burst in a predetermined one of a sequence of uplink slots of a repeating frame, each uplink slot having a predetermined duration, the uplink bursts each being separated by an uplink interburst guard time, the uplink burst being used at least in part in determining spatial parameters for a corresponding subsequent downlink burst;

a receiver to receive a burst in a predetermined one of a sequence of downlink slots of the same repeating frame after transmitting the uplink burst in accordance with the determined spatial parameters from the preceding uplink slot of the same frame, each downlink slot having a predetermined duration that is greater than the duration of the uplink slots, each downlink slot being associated with an uplink slots, the downlink bursts each being separated by a downlink interburst guard time; and a processor to determine the duration of the interburst guard times and to suspend operation of the receiver and transmitter for an interframe guard time after the sequence of downlink bursts.

48. The apparatus of claim 47, wherein the downlink burst associated with the uplink burst having a different transmission modulation format than other downlink bursts and the same as the associated upl ink burst.

49. The apparatus of claim 47, wherein the interframe guard time precedes the sequence of uplink slots.

50. The apparatus of claim 47, wherein the sequence of uplink slots comprises three adjacent uplink slots, the sequence of downlink slots comprises three adjacent downlink slots.

51. The apparatus of claim 47, wherein the processor further suspends operation of the receiver and transmitter for a transition guard time between the sequence of uplink slots and the sequence of downlink slots.

52. A radio of a time division radio communications system comprising a transceiver for communicating with other radios of the time division radio communication system over radio channels using a preestablised time division frame structure, the preestablished frame structure comprising:

a sequence of uplink slots each having a predetermined duration, the uplink slots supporting a plurality of transmission modes to support different data rates and being for use at least in part in determining spatial parameters for use in receiving subsequent uplink slots from fef the corresponding uplink transceiver;

a sequence of downlink slots after the sequence of uplink slots, each having a predetermined duration that is greater than twice the duration of the uplink slots, each downlink slot being associated with an uplink slot, the downlink slots being for use in sending data to corresponding uplink transceiver using the determined spatial parameters from the preceding unlink slots of the same frame, the downlink slots supporting a plurality of transmission modes to support different data rates, so that the ratio of the downlink data rate to the associated uplink data rate can be set at a variety of different values including values that are greater than two to one, the ratio depending on the relative amount of data to be transferred in each direction.

53. The radio of claim 52, wherein the date rate for each uplink slot can be different from the data rate for each other uplink slot.

54. The radio of claim 52, wherein each uplink slot is associated with a unique downlink slot, the date rate for each uplink slot being independent of the data rate for the associated downlink slot.

55. The radio of claim 52, wherein a downlink slot transmission mode can be set to have a higher data rate than a corresponding uplink slot transmission modes, so that the downlink data rate is greater than the uplink data rate by a ratio that is more than the ratio of the duration of the downlink slot to the duration of the uplink slot.

56. The radio of claim 52, wherein the plurality of transmission modes each comprise a plurality of different modulation formats.

57. The radio of claim 52, wherein the plurality of transmission modes each comprise a plurality of different encoding formats.

58. The radio of claim 52, wherein the sequence of uplink slots precedes the sequence of downlink slots.

59. An apparatus comprising:

means for receiving data in a sequence of uplink slots of a repeating time frame each slot having a predetermined duration;

means for determining a set of spatial parameters for the data received in each of the uplink slots for use in transmitting to and receiving from transceivers corresponding to the received data;

means for transmitting data in a sequence of downlink slots of the same repeating time frame after receiving data in the sequence of uplink slots, each slot having a predetermined duration that is greater than twice the duration of the uplink slots, each downlink slot being associated with an uplink slot, the data in each downlink slot being transmitted using the determined spatial parameters for the corresponding uplink data from the preceding uplink slots of the same time frame.

60. The apparatus of claim 59, further comprising means for selecting transmission modes for the uplink and downlink slots so that the ratio of the downlink data rate to the associated uplink data rate can be set at a variety of different values including values that are greater than two to one, the ratio depending on the relative amount of data to be transferred in each direction wherein the means for selecting can select the date rate for each uplink slot to be different from the data rate for each other uplink slot.

61. The apparatus of claim 59, wherein each uplink slot is associated with a unique downlink slot, and wherein the means for selecting can set the date rate for each uplink slot independently of the data rate for the associated downlink slot.

62. The apparatus of claim 59, wherein the means for selecting can select a downlink slot transmission mode to have a higher data rate than a corresponding uplink slot transmission mode, so that the downlink data rate is greater than the uplink data rate by a ratio that is more than the ratio of the duration of the downlink slot to the duration of the uplink slot.

63. The apparatus of claim 59, wherein the plurality of transmission modes each comprise a plurality of different modulation formats.

64. The apparatus of claim 59, wherein the plurality of transmission modes each comprise a plurality of different encoding formats.

65. The apparatus of claim 59, wherein the sequence of uplink slots precedes the sequence of downlink slots.

66. A method comprising:
  receiving data in a sequence of uplink slots of a repeating time frame each slot having a predetermined duration;
  determining a set of spatial parameters for each slot using the received data for use in transmitting to and receiving from transceivers corresponding to the received data;
  transmitting data in a sequence of downlink slots of the same repeating time frame after the sequence of uplink slots using the determined spatial parameters from the preceding uplink slots of the same time frame, each slot having a predetermined duration that is greater than twice the duration of the uplink slots.

67. The method of claim 66, wherein the data in each downlink slots is transmitted in any one of a plurality of transmission modes to support different downlink data rates the transmission modes being selected so that the ratio of the downlink data rate to the associated uplink data rate can be set at a variety of different values including values that are greater than two to one wherein selecting includes selecting the date rate for each uplink slot o be different from the data rate for each other uplink slot, the ratio depending on the relative amount of data to be transferred in each direction.

68. The method of claim 66, wherein each uplink slot is associated with a unique downlink slot, and wherein selecting includes setting the date rate for each uplink slot independently of the data rate for the associated downlink slot.

69. The method of claim 66, wherein selecting includes selecting a downlink slot transmission mode to have a higher data rate than a corresponding uplink slot transmission mode, so that the downlink data rate is greater than the uplink data rate by a ratio that is more than the ratio of the duration of the downlink slot to the duration of the uplink slot.

70. The method of claim 66, wherein the plurality of transmission modes each comprise a plurality of different modulation formats.

71. The method of claim 66, wherein the plurality of transmission modes each comprise a plurality of different encoding formats.

72. The method of claim 66, wherein the sequence of uplink slots precedes the sequence of downlink slots.

* * * * *

UNITED STATES PATENT AND TRADEMARK OFFICE
CERTIFICATE OF CORRECTION

| | | |
|---|---|---|
| PATENT NO. | : 7,519,011 B2 | Page 1 of 1 |
| APPLICATION NO. | : 10/262104 | |
| DATED | : April 14, 2009 | |
| INVENTOR(S) | : Petrus et al. | |

It is certified that error appears in the above-identified patent and that said Letters Patent is hereby corrected as shown below:

In column 27, at line 62 delete, "trailsmitting" and insert -- transmitting --.

In column 29, at line 54 delete, "upl ink" and insert -- uplink --.

In column 30, at line 7 after, -- from -- delete "fef".

In column 32, at line 10 delete, "o" and insert -- to --.

Signed and Sealed this

Seventh Day of September, 2010

David J. Kappos
*Director of the United States Patent and Trademark Office*